United States Patent [19]
Albano et al.

[11] Patent Number: 5,592,484
[45] Date of Patent: Jan. 7, 1997

[54] TELECOMMUNICATION NETWORK HAVING A NUMBER OF STATIONS WHICH ARE CONNECTED TO A TOKEN RING NETWORK, AND STATION FOR SUCH A NETWORK

[75] Inventors: Andre Albano, La Colle Sur Loup; Rene Chuniaud, Cagnes Sur Mer; Jacques Fieschi, Saint Laurent du Var; Patrick Michel, La Gaude; Jean-Francois Le Pennec, Nice, all of France

[73] Assignee: International Business Machines Corporation, Armonk, N.Y.

[21] Appl. No.: 455,826

[22] Filed: May 31, 1995

[30] Foreign Application Priority Data

Jul. 28, 1994 [EP] European Pat. Off. .............. 94480068

[51] Int. Cl.$^6$ ........................... H04J 3/12; H04L 12/433
[52] U.S. Cl. ...................... 370/452; 340/825.05
[58] Field of Search .................. 370/58.1–58.3, 370/60, 68.1, 85.4, 85.5, 85.6, 85.7, 85.12, 85.15, 94.1, 95.1, 110.1, 62; 340/825.05, 825.5, 825.51, 825.52; 379/258, 268, 290, 372, 377, 387, 389, 201

[56] References Cited

U.S. PATENT DOCUMENTS

| | | | |
|---|---|---|---|
| 4,792,947 | 12/1988 | Takiyasu et al. | 370/85.5 |
| 4,944,038 | 7/1990 | Hardy et al. | 370/85.5 |
| 5,253,252 | 10/1993 | Tobol | 370/85.5 |
| 5,276,682 | 1/1994 | Van As et al. | 370/85.5 |

*Primary Examiner*—Alpus H. Hsu
*Attorney, Agent, or Firm*—Joscelyn G. Cockburn; John B. Frisone

[57] ABSTRACT

A token ring interconnects a plurality of telephone stations and a ring server station. All communication is conducted via a TDM frame which includes a START field, a TOKEN field which can have any one of three states (free, busy or dedicated to communication by the ring server station), calling and called station address fields, a field for data to be sent to the ring server station and a plurality of data slots via which the telephone stations exchange data once the slots are allocated. When a connection is desired by a station it seizes a free token by making it busy, inserts pertinent field data and send the TDM frame on to the ring server station which establishes the connection via an answer frame.

4 Claims, 13 Drawing Sheets

5,592,484

TELECOMMUNICATION NETWORK HAVING A NUMBER OF STATIONS WHICH ARE CONNECTED TO A TOKEN RING NETWORK, AND STATION FOR SUCH A NETWORK

TECHNICAL FIELD OF THE INVENTION

The invention relates to data communication and particularly to a telecommunication network having a number of stations which are connected to a token ring.

The interconnection between several telephone sets, or telephone servers generally requires sophisticated and expensive devices such as PBX.

Digital telephone sets exist in the art which are based on the well known ISDN network and infrastructure which is unfortunately not available in any building.

Therefore, there is a need for the possibility of interconnection between several telephone sets which would be based on a ring.

FIG. 1 illustrates such a ring which is composed of a number of 5 telephone stations (station 2–7) with a ring server (8) which are connected via a ring. It is highly desired to provide such a ring network which could profit from the existing physical wiring existing in the building for providing a TDM isochronous token ring which can convey voice, video and data.

SUMMARY OF THE INVENTION

The problem is to provide a digital telecommunication network which can use the existing physical wiring in the building and allow digital communication between stations, such as telephone sets.

This problem is solved by means of the telecommunication network according to the present invention which has a number of stations, such a telephone sets, which are connected to a ring server station by means of a token ring. Each station comprises a receiver for receiving a Time Division Mutiplex (TDM) frame and a transmitter for transmitting the frame to the token ring. The structure of the frame comprises a first START field. A second TOKEN field which can carry three distinctive states: a first value (FF) representative of the token being free, a second value (00) representative of the token being busy and a third value (AA) being controlled by the ring server station. The TDM frame further comprises a third SNUM field representative of a slot number and a fourth and fifth field which are respectively representative of an identification address of an emitting and a receiving station. An additional SIGNA field is representative of the signalling message to by transmitted to the server station and is followed by a number of n TDM slots which are affected for the actual communication of data within the TDM frame. The station further comprises means under control of a processor (200) for detecting the presence of said first value into said TOKEN field and for replacing said first value (FF) by said second value (00) in order to inform said ring server station that the token is requested.

Additionally, the station has means for substituting the contents of said fourth ADDR_E field and said fifth ADDR_R field with values generated under control of said processor characterizing the identity of the calling and the called station. The occurrence of the busy token is monitored and followed by an analysis of the contents of the ADDR_E and ADDR_R field in order to determine the identity of the calling and the called station. The contents of the second TOKEN field is then substituted by the token ring server (8) in order to inform the calling and the called station that the communication is allowed and can be established. The ring server also substitutes the contents of the third SNUM field via a value which is representative of the slot number which is assigned to the communication between the calling and the called station.

Preferably, each station further comprises:

a receiver which receives the TDM frame for generating a first control signal (STADEC) and a second control signal (STODEC) which are respectively representative of the beginning and the end of the TDM frame;

a counter controlled by said first control signal (STADEC) and clocked by clock signal for generating a third control signal (SYNC);

means connected to said receiver and receiving TDM frame coming from the token ring for generating a clock signal and a data flow (DIN) extracted from said TDM frame;

a coder decoder circuit connected to a telephone set for providing the A/D and the D/A conversion of the voice;

a serializer circuit having an input bus connected to the output of a register controlled by said processor;

a selector circuit having a first input receiving said data flow extracted from said TDM frame and a second input which is connected to the output of said serializer; said selector having an output lead which is connected to said transmitting means and which receives one among the two signals existing at its input in accordance with the state of a fourth control signal (SUBST1);

a token substitution circuit which comprises a first RS latch which has a S input lead receiving said first control signal (STADEC) and a R input lead receiving said third control signal (SYNC); said first RS latch having an output lead which is connected to a first input lead of a first AND gate, said first AND gate having a second input receiving said data flow (DIN) and a third input receiving a control signal (REQ) generated by said processor when it wishes to request the token;

a second RS latch which has a S input lead connected to the output of said first AND gate and a R input lead connected to the output of a first OR gate, said first OR gate having a first input receiving the inverted data flow (DIN) and a second input lead which receives said third control signal (SYNC);

a second OR gate which has a first input receiving the output of said second RS latch and a second input which is connected to receive a control signal coming from said processor, said second OR gate generating said fourth control signal (SUBST1).

The invention also provides with a digital station which has the capability of connection to a token ring network.

DESCRIPTION OF THE PREFERRED EMBODIMENT OF THE INVENTION

Figure 1:
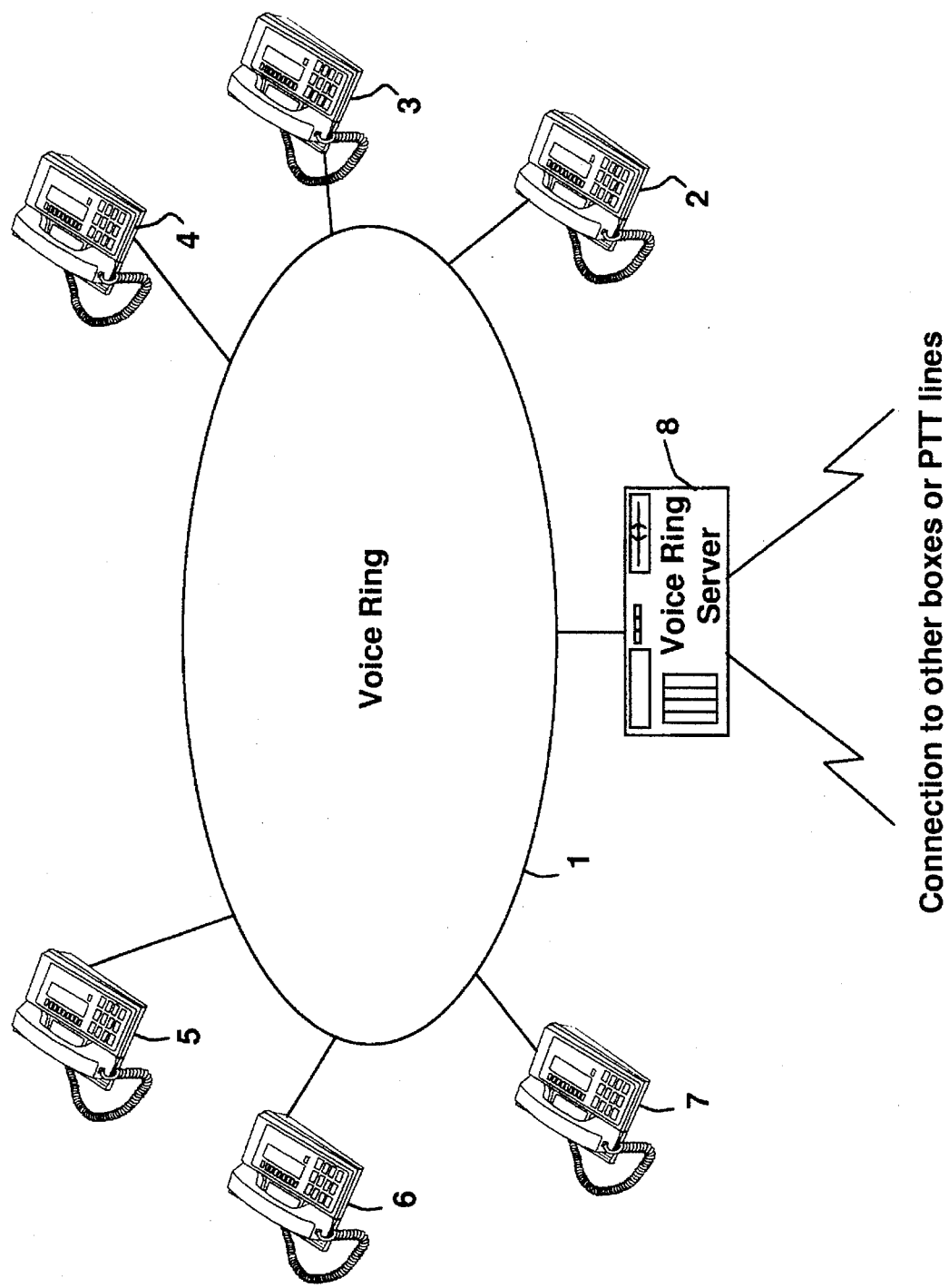
FIG. 1 is an illustrative view of a ring which allows the connection of telephones and a voice ring server.
Figure 2:
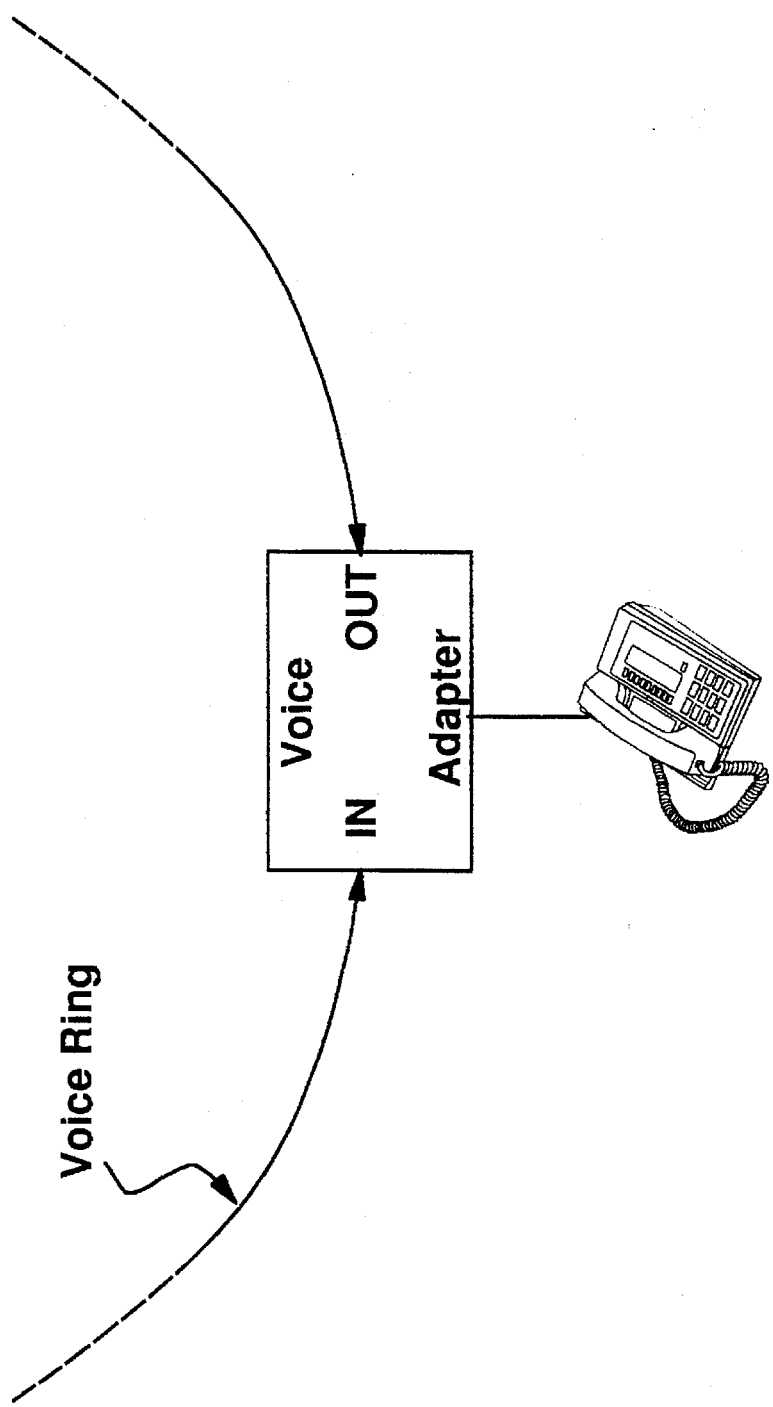
FIG. 2 illustrates a schematical view of the circuit according to the present invention which allows the connection of a telephone set to a ring.
Figure 3:
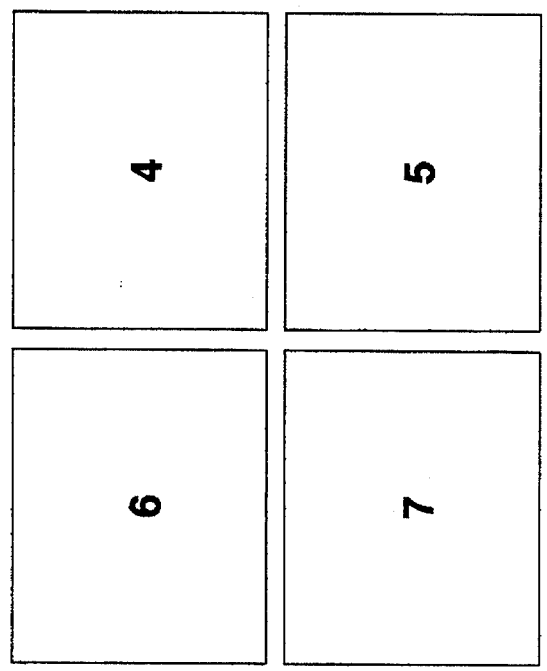
FIG. 3 shows how FIGS. 4–7 must be arranged in order to provide the structure of the telephone ring connection circuit according to the present invention.
Figure 4:
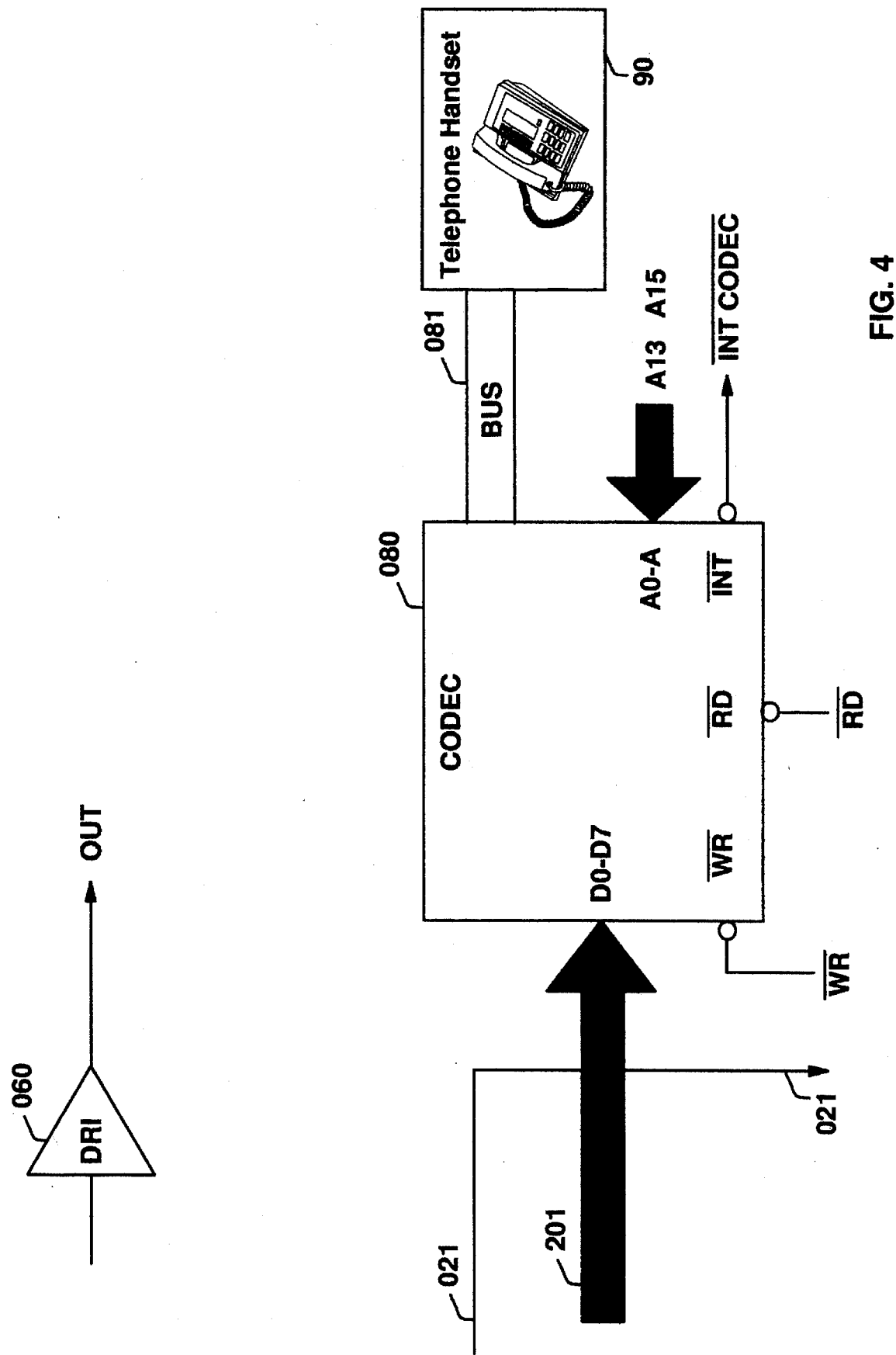
FIGS. 4–7 shows the comprehensive structure of the telephone ring connection circuit in accordance with the present invention.
Figure 5:
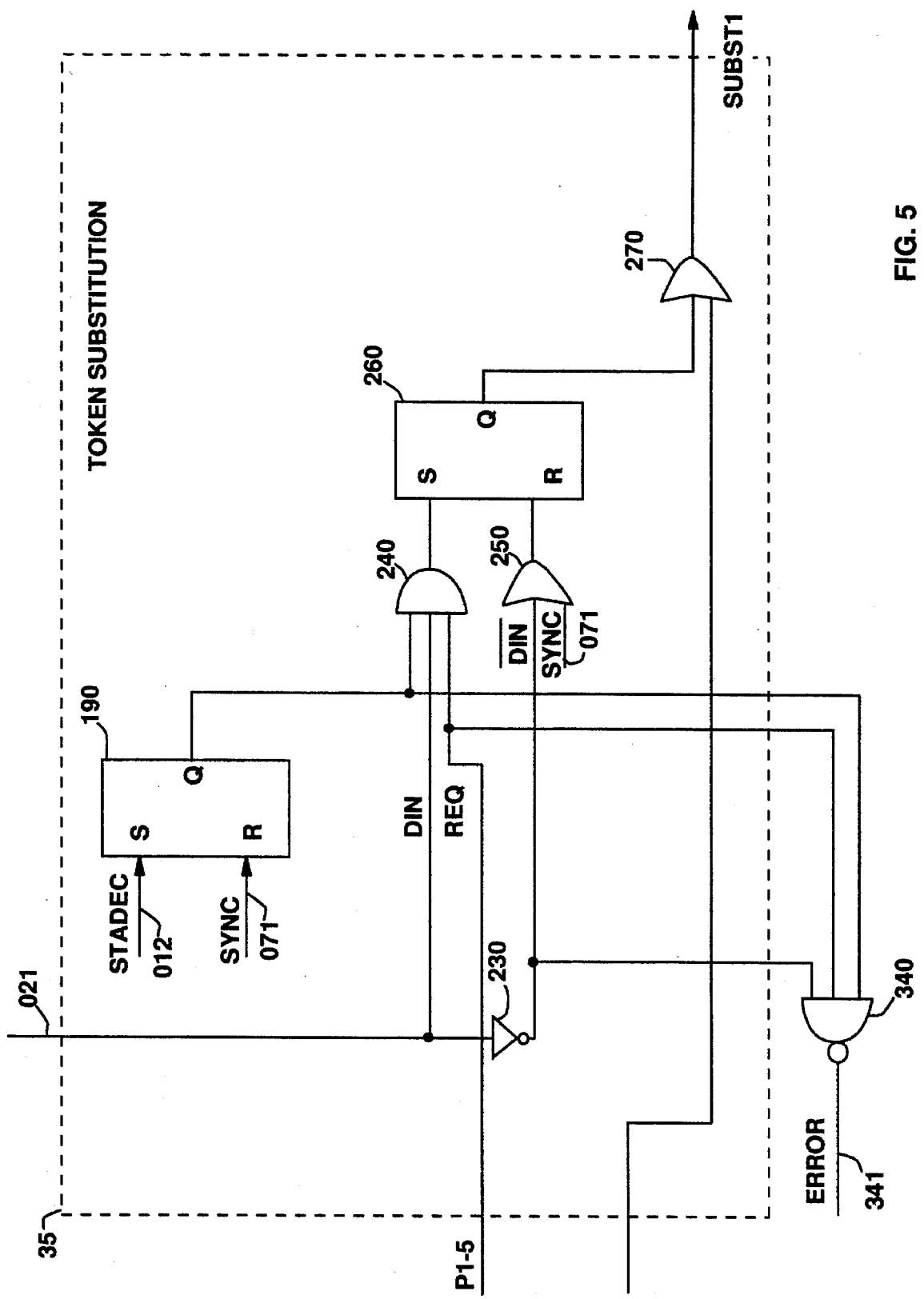
Figure 6:
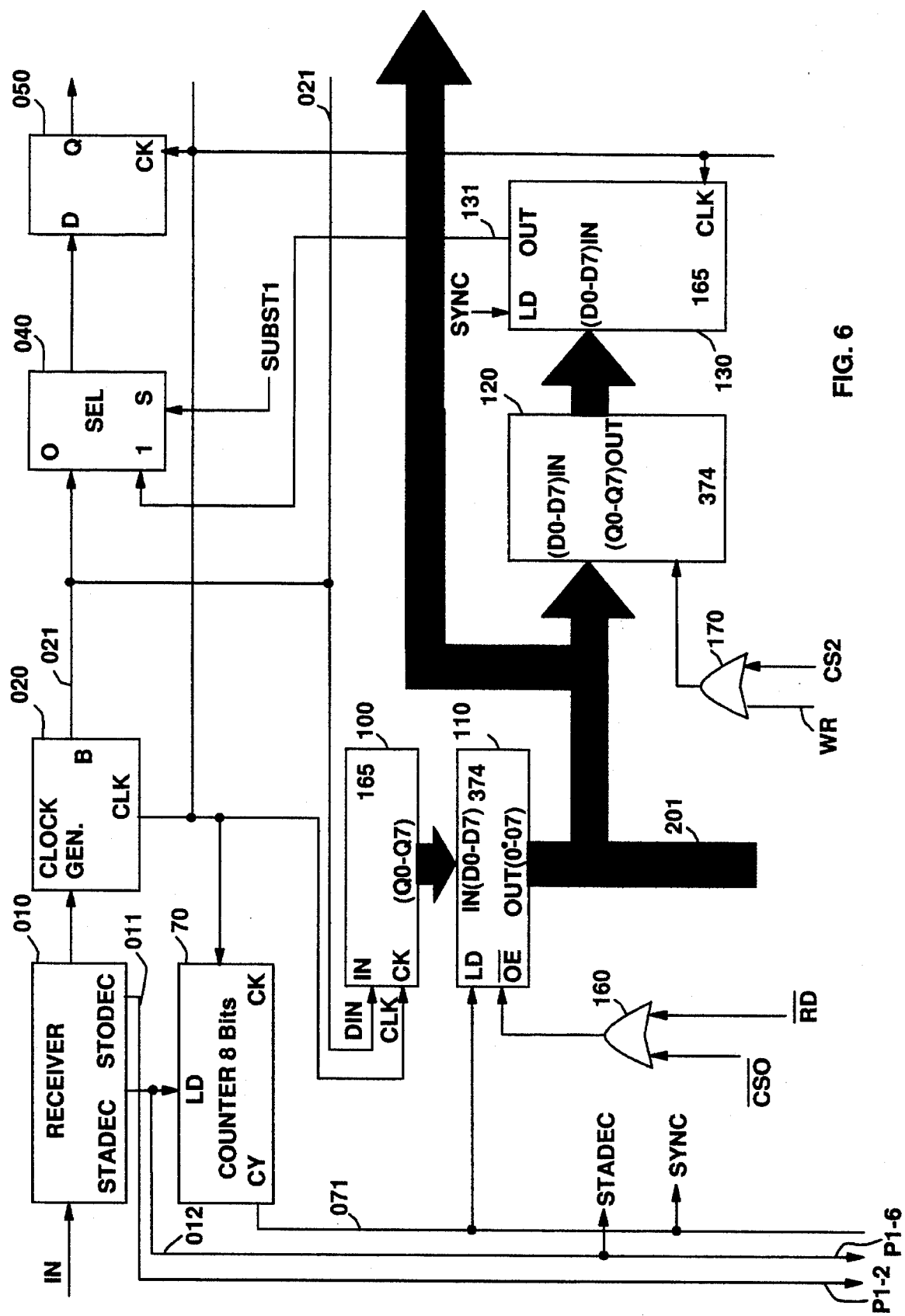

A synoptic view of the circuit providing a TDM telephone set in accordance with the invention is shown in FIG. 2. The comprehensive structure of the latter is described below with details in reference with FIGS. 4–7 which must be arranged in accordance with the schematic of FIG. 3. A telephone Handset 90, comprising the combination of a microphone, a loudspeaker and a keyboard communicates with a Coder-Decoder 80, hereinafter referred as a CODEC circuit, through a telephone bus 81. CODEC circuit 80 is a well-known component which is available from many telecommunication manufacturers. Such a component is available by SIEMENS under the part number PSB 45030.

However, any other CODEC circuit can be alternatively used for carrying out the telephone ring connection circuit of the invention. Generally speaking, CODEC circuit 80 performs the conversion of the analog signal provided from the telephone handset into a 64 Kbps digital PCM stream of data, in according with a A or MU coding process.

In addition to CODEC circuit 80, the apparatus comprises buffering circuits which are used, both for the reception and transmission of the voice, and additional circuits hereinafter described with details which will allow the processing of the token. In particular, the apparatus comprises a receiver 10 and a DRI driver 60 which provides the physical connection to the token ring. Particularly, receiver 10 allows the receiving a Time Division Multiplex (TDM) frame which structure will be described hereinafter in detail and A specific token substitution circuit 35, comprising gates 190, 230, 240, 250, 260 and 270, is under control of a processor 200, such as an INTEL 8051, which is used as a SUBST1 control signal for controlling the substitution of some bytes of the TDM frame.

To achieve this substitution, processor 200 is associated with a serializer 130 which contents is loaded by a register 120 under control of the processor. The serialized output is transmitted to one input of a selector circuit 40 which is controlled by the SUBST1 control signal. As will be described hereinafter with details, processor 200 derives from the contents of one specific field (SNUM) of the TDM frame, which is controlled by the ring server 8, a value which is stored into a register 18B which is used for initializing a counter circuit 180. The carry signal (CY) of this circuit is used as an interrupt control signal for processor 200.

CODEC circuit 80 particularly provides the detection of the Hook-on of the telephone set which results in the generation of an an (inverted) INTCODEC interrupt signal being transmitted to processor 200 via its INT0 interrupt lead. This will result in the processing of an appropriate interrupt routine by processor 200 in order to read the status of the registers CODEC via a data bus 201 connected to processor 200. The addressing of CODEC 80 is provided by means of a address decode circuit 320 of the type LS 138 which receives the A13–A14–A15 address bus 202 of processor 200 and issues the corresponding chip select control signals, particularly a CS0 (Y0), CS1 (Y1), CS2 (Y2), CS8 (Y3) chip select control signals. From the contents of the read register, processor 200 is then made aware of the HOOK-ON which occured, but can also determine the number to call, the particular communication mode, the transfer communication etc. . . CODEC circuit 80 has an INT output lead which is connected to the INT0 interrupt input lead of processor 200 and is used for carrying an interrupt signal designed for the latter processor.

Processor 200 has a P1.5 programmable output lead which is connected to a first input lead of an AND gate 240 and to a first input of a NAND gate 340. This P1.5 output lead is used by processor 200 in order to issue a request for the token.

The circuit further comprises a receiver 10 which is connected to the IN twisted pair of the ring and detects the START byte as defined in the 802.5 CCITT Recommendation. This START byte is known to be byte 'JK0JK000' which is detected by receiver 10 and results in the generation of a START_DECODE (or STATDEC) signal by the latter on a lead 012 being transmitted to the LOAD input of a 3_bits counter 70, to the P1.6 input lead of processor 200, and at last to the Set input lead of a RS latch 190. Latch 190 has a Q output lead connected to a second input lead of AND gate 240, and a second input of NAND gate 340.

Connected to receiver 10, a clock generator 20 receives the bipolar coding coming from the ring throughout the latter and generates a CLK clock signal which will be distributed throughout the machine. In a preferred embodiment of the invention, the clock signal is a 4 MHz signal. However, it should be noticed that the skilled man will straightforwardly adapt the circuit in order to match any other speed value and requirements, for example a token ring operating a 16 MHz or other frequencies.

The clock signal is transmitted to the clock input lead of counter 70, to the clock input lead of a shift register 100 and 130, to the clock input lead of a 16 bit counter 180 and to the clock input lead of a D-latch 50.

From the CLK clock signal received, counter 70 generates a SYNC byte clock signal on a lead 71 which is synchronized on the occurrence of the STADEC signal. The SYNC signal is transmitted to the LOAD input of a tri-state latches circuit 110, such as of the well-known 374 serie. SYNC signal is also transmitted to the P1-0 input lead of processor 200, to the reset input lead of RS latch 190, to a first input of an OR gate 250, and to a first input lead of an AND gate 290 and a AND 310.

Clock generator 20 provides at a B output lead a DIN stream of digital data which is synchronized with the clock being extracted from the data. This DIN stream of data is transmitted to a first input lead (referenced as being the zero input lead), to the serial input lead of shift register 100, to a third input lead of AND 240, and also to a second input lead of OR 250 via an inverter 230, and to a third input of an NAND 340 via an inverter 230.

It appears that AND gate 240 has its output which switches to a high level when DIN signal becomes high. A free token is defined by the byte 'FF' (in hexadecimal, or '11111111' in binary). The token byte is always following the STARTDEC byte as it appears in the following frame structure:

| START | TOKEN | SNUM | ADDR_E | ADDR_R | SIGNA | S 01 | S 02 |

| S 54 | S 55 | STOP | with 'START' corresponding to "JK0JK00"
'TOKEN' being one among the following values: "FF" (H) (free token) "00" (H) (busy token) or
"AA" (H) (answering frame from server).
'ADDR_E' corresponding to the address of the emitting set
'ADDR_R' corresponding to the address of the receiving set or the address of the server in the case of an external call.
'SIGNA' represents the mode of communication with the server. It characterizes the action to be taken.
'SNUM' represents the slot number which will be affected to the communication by the voice ring server.
'S xx' corresponds to the slot xx in the TDM frame.

In a particular embodiment, the STOP field may be preceded by the existence of a traditional Frame Checking Sequence (FCS) field or CRC sequence which is recalculated by each station. The STOP byte may be 'JK1JK1XX'. It should be noticed that the number of slot 'Sxx' available can be adapted in accordance with the user's requirements.

On the occurrence of a free token, the Q output lead of latch 190 is set to a high level because of the high level of STADEC signal. Additionally, assuming that processor 200 requests the token, the P1.5 output lead is also set to a high level and, at last, the DIN lead 21 carries a high level since a free token consists in the succession of eight "1". Therefore, it appears that the output lead of AND gate 240 switches to a high level. Consequently, latch 260, which S input lead receives the output signal of AND 240, has its output lead which also switches to a high level.

As seen before, the free token results in the output of latch 260 being set to a high level, what causes the output of OR gate 270, hereinafter referred to as SUBST1 signal, to switch to a high level. The SUBST1 lead is connected to the select input lead of selector 40, whereby controlling one of the two inputs leads of the latter selector, respectively lead 21 and lead 131, to be connected to the output of selector 40. The latter output lead is wired to the D input lead of latch 50.

Therefore, whenever the SUBST1 signal is set to a low level, the data is directly conveyed through the token on lead 21 to the D input lead of latch 50. In this way, the selector 40 allows the data received from the IN leads of the token ring to be diverted in a transparent manner to the OUT leads of the ring, throughout latch 50 and a bipolar driver 60. It should be be noticed that this transparent transmission requires the use of an additional mechanism based on a SR latch 300 and two AND gates 290 and 310 which operates as follows: At the beginning of each TDM frame, processor 200 maintains a low level at its P1.4 output lead which is connected to a second input lead of AND gate 290, the output of which being connected to the S input lead of latch 300. Furthermore, processor 200 initializes the shift register 130 by storing a set of eight zero in the latter. To achieve this, processor 200 performs a write operation by setting the WR control signal and the CS2 chip select control signal, the two control signals being transmitted to corresponding input leads of an OR gate 170 having its output lead connected to the LOAD input lead of register 120. P1.4 output lead of processor 200 is also connected to the inverted input lead of AND gate 310, the output of which being connected to the R input lead of latch 300. Therefore, the Q output of latch 300, which is connected to the second input lead of OR 270, carries a low level which permits the transparent transmission mode, since the SUBST1 signal is directly derived from the output of latch 260 via OR 270. Conversely, whenever the SUBST1 signal is set to a high level, what causes the output of a shift register 130 to be connected to the D input lead of latch 50, the selector 40 provides the transmission of a set of eight data bits stored in the latter register to the appropriate slot within the Time Division Multiplex frame. This is achieved by the serialization of the parallel data loaded into register 120 and connected to the D0–D7 input leads of shift register 130. The serialization is performed at the rhythm of the clock existing on the clock input lead of shift register 130 whenever the SYNC signal is set to a high level.

In the case where the byte which follows the START byte "JK0JK000" appears to be different from "FF" (in Hex.), the output of OR gate 250 causes the reset of latch 260, what results in SUBST1 signal at the output of OR 270 being switched to a low level.

Furthermore, the output of NAND 340 switches to a low level. This is used as an interrupt signal which is transmitted to the INT1 input lead of processor 200.

In addition to this, the apparatus comprises a 16-bit counter 180 which is loaded by the processor 200 via a set of latches 185. The loading is performed by means of a WRITE control signal generated simultaneously with a CS1 and CS3 chip select control which are respectively connected to an input lead of OR gate 210 and 220. The value which is stored into the counter 180 corresponds to SNUM -1. Therefore, the processor 200 which polls the level of the latter CY signal is made aware that on the occurrence of the next SYNC signal, the contents of register 110 loaded with data for the CODEC should be read. This is achieved by the used of a OR gate 160 having an output connected to the Output Enable (inverted) or shift register 110, and two input leads which are respectively connected to receive the CS0 chip select control signal and the (inverted) RD control signal coming from processor 200.

Figure 7:
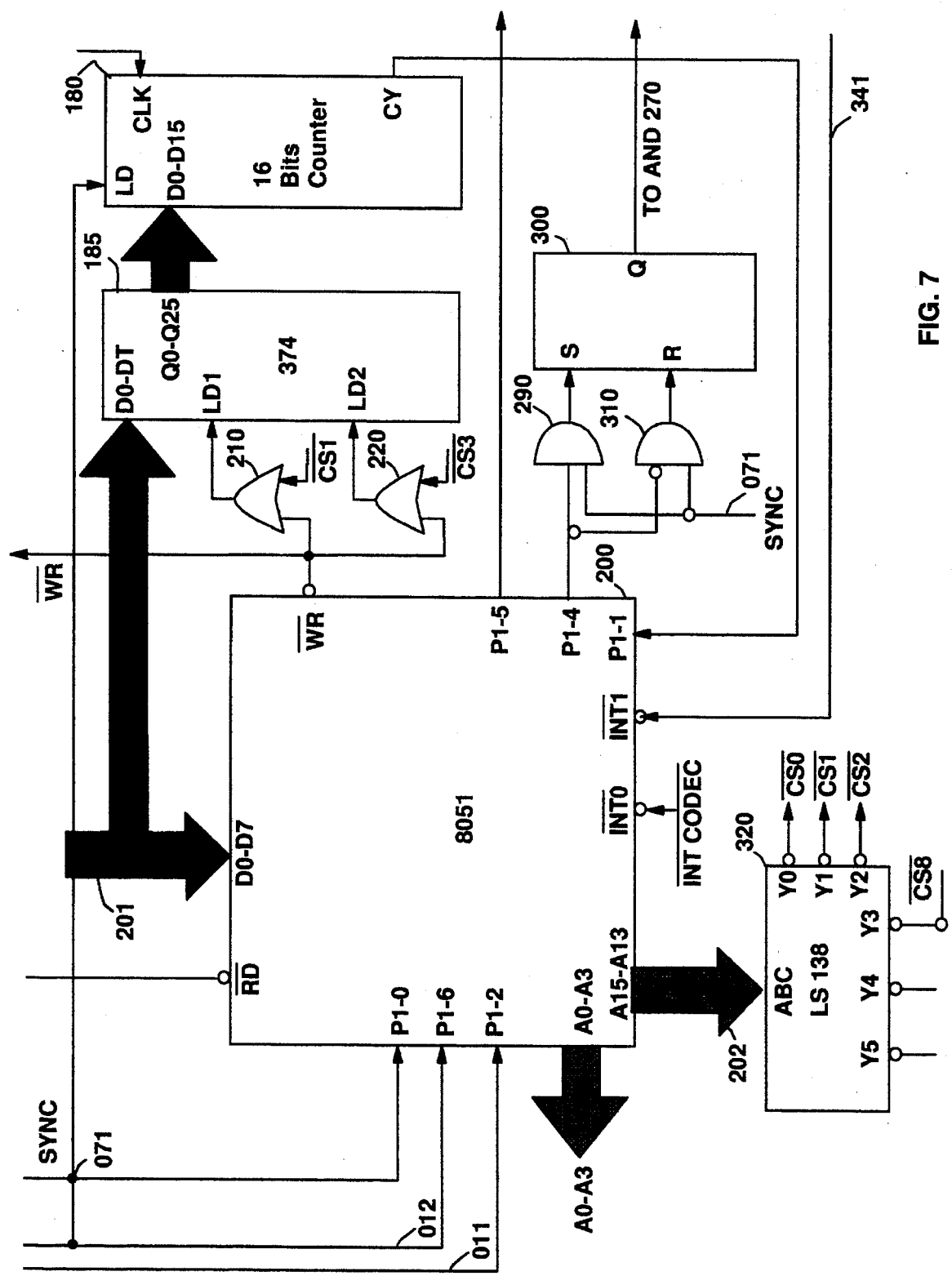
Figure 8:
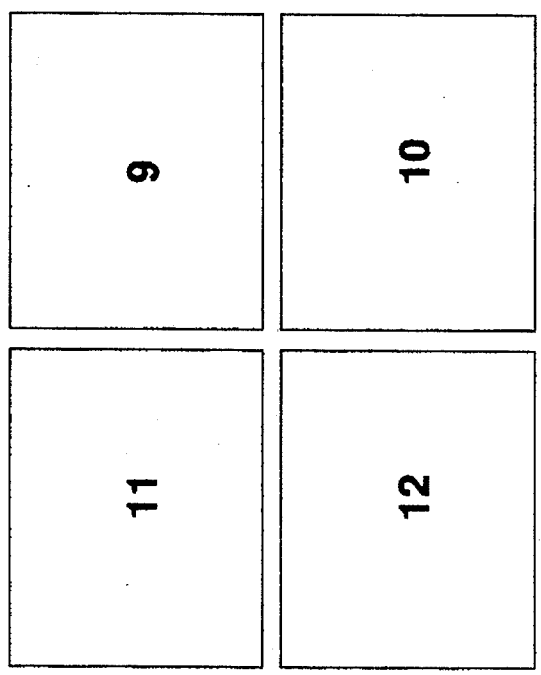
FIG. 8 illustrates the arrangement of FIGS. 9–12 needed to provide the structure of the server ring connection circuit according to the present invention.
Figure 9:
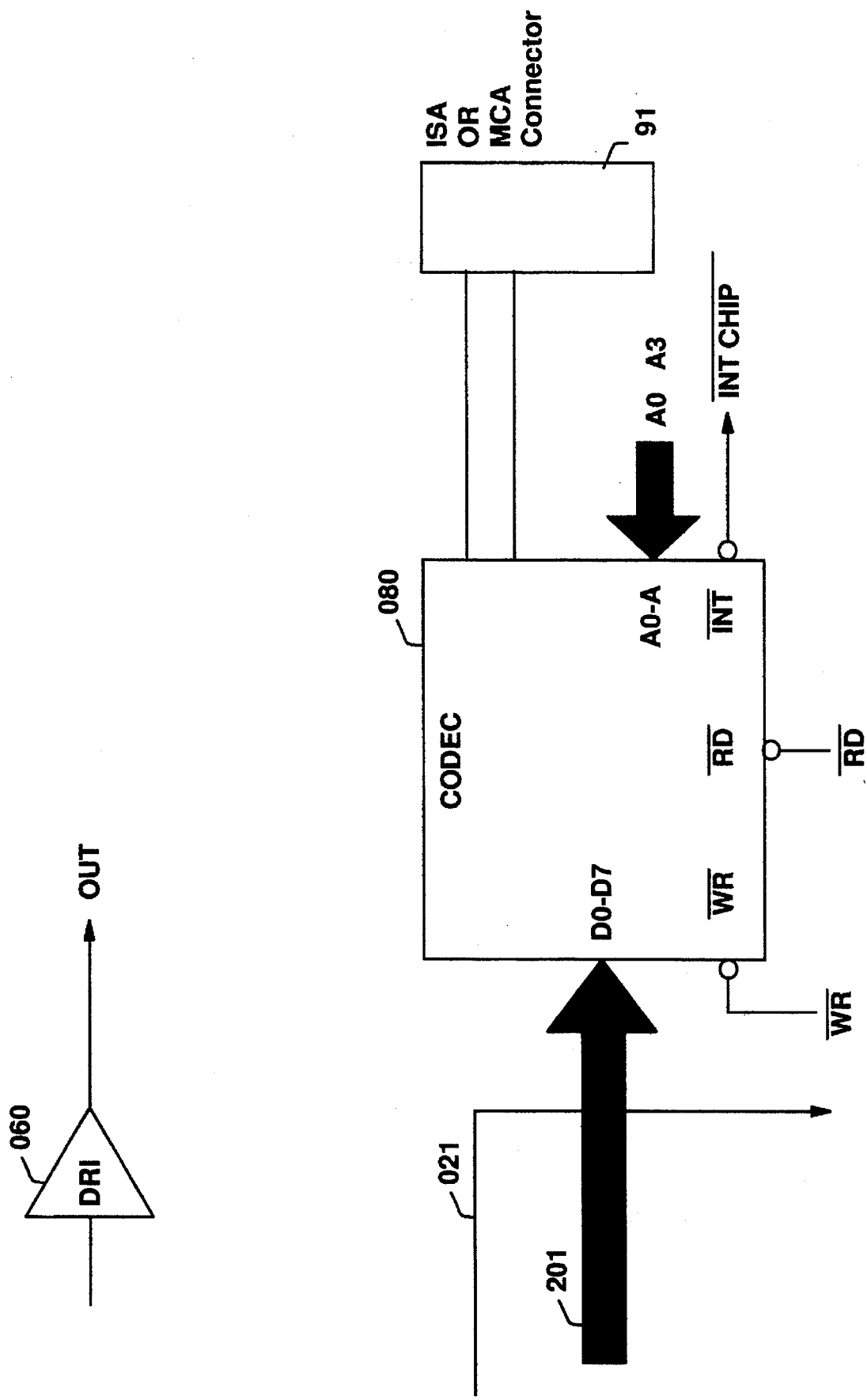
FIGS. 9–12 shows the comprehensive structure of the voice ring server connection circuit in accordance to the present invention.
Figure 10:
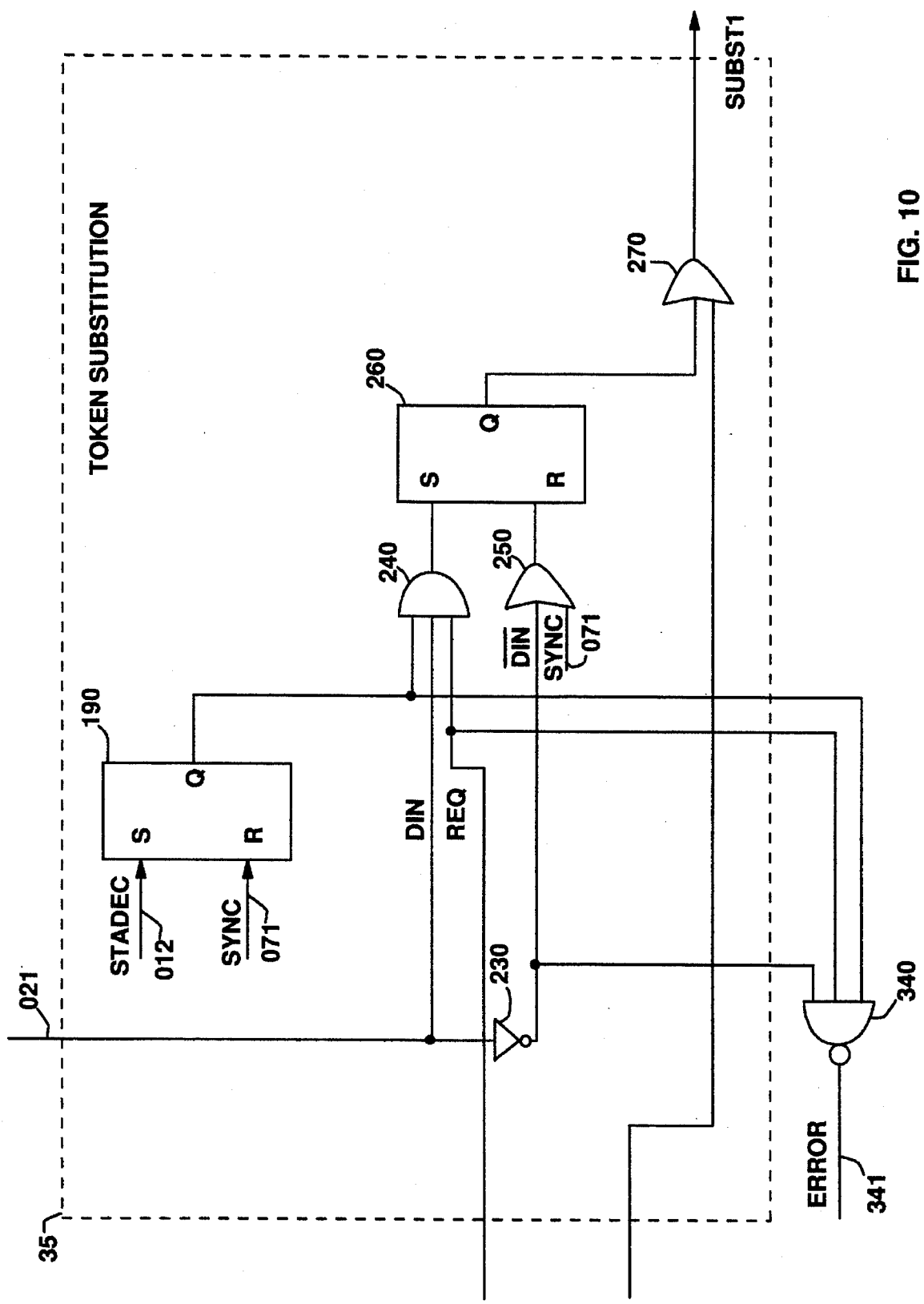
Figure 11:
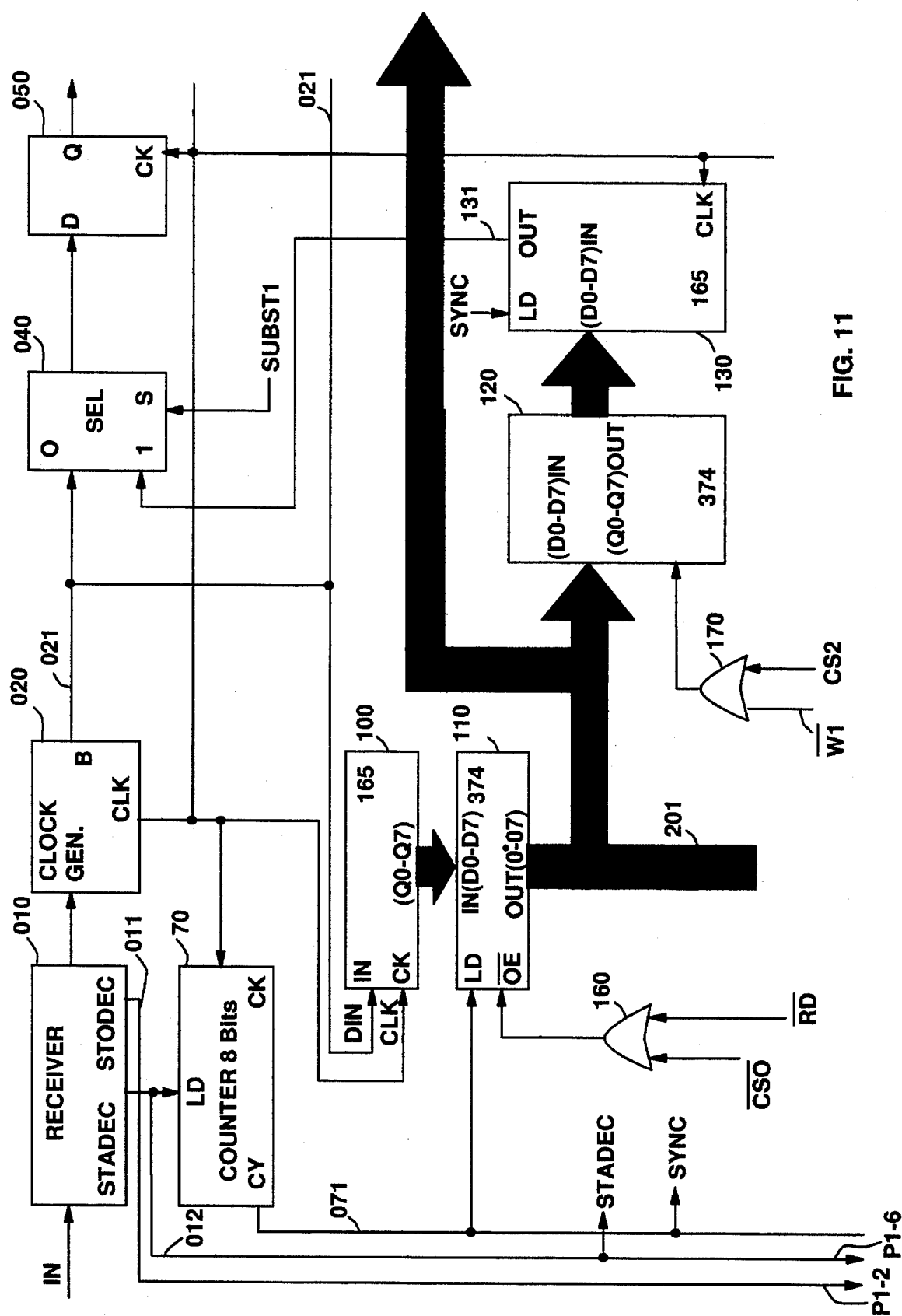
Figure 12:
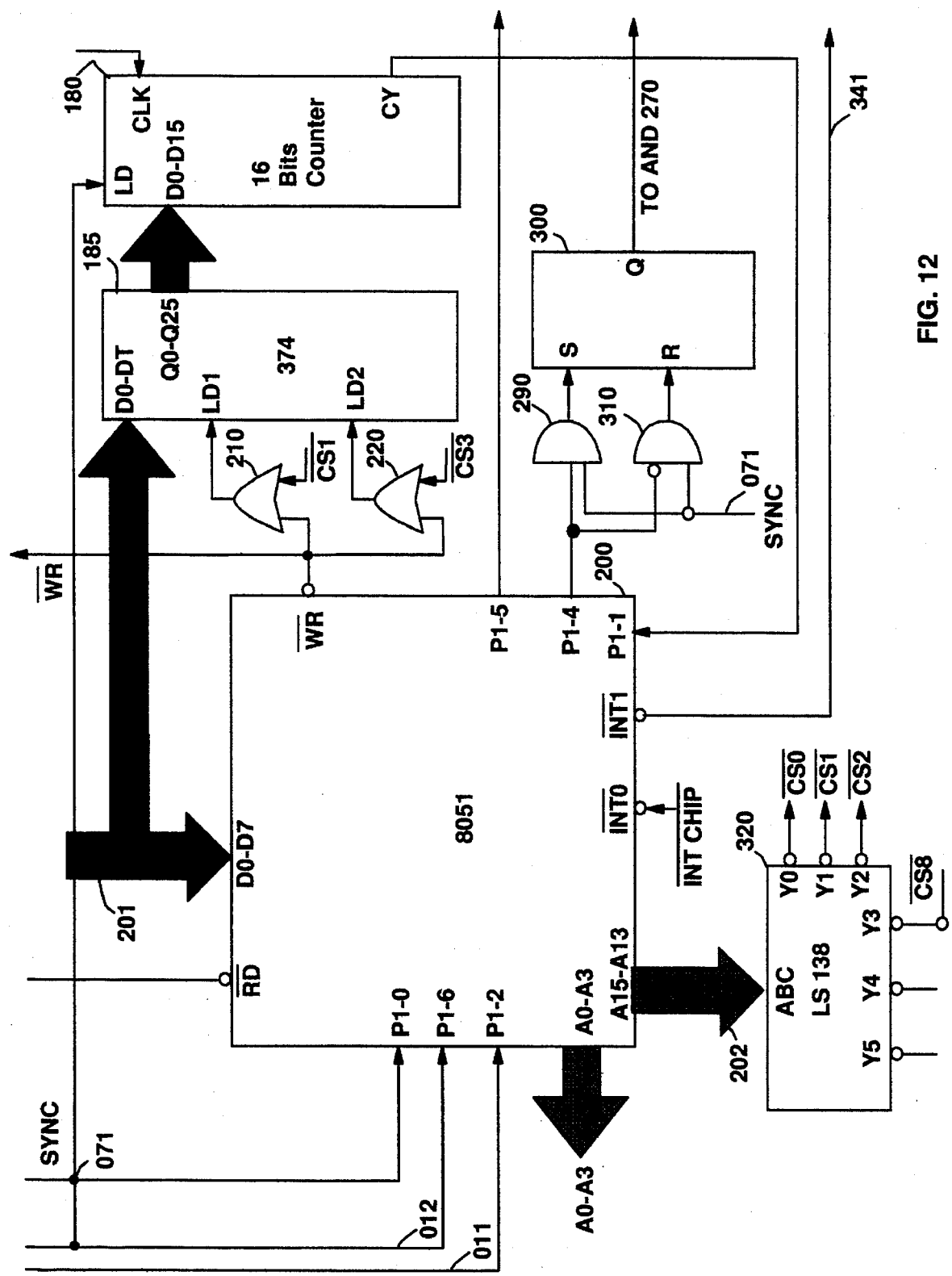

With reference with the FIGS. 9–12, which arrangement is shown in FIG. 7, there is illustrated the structure of the voice ring server 8. Voice ring server consists in a specific card which is plugged in a common personal computer and it appears that the structure is basically similar to that of the telephone ring connection circuit illustrated in FIGS. 4–7. Therefore, for clarity's sake, the elements being common to those of the telephone will keep the same reference number. The circuit of the voice ring server comprises, in lieu of telephone set 90 existing in the telephone ring connection circuit described before, a ISA or Micro Channel Architecture (MCA) chip adapter 91 which provides the interface of the Personal Computer bus (through the ISA or MCA connector) and the processor 200 located in the card. When an external connection is required, this is provided by means of the chip adapter. For example, if the personal computer has an I.S.D.N. card which is also plugged in a slot, the communication is made possible from the server card to an external ISDN network. It will appear from the description below that the isochronous function of the ring is maintained within processor 200 by the use of the internal registers therein located. This allows the store and forward process of communicated data. As a consequence, the server card plugged in the personal computer always operate in a substitution mode, that is the SUBST1 signal is always set to a high level.

Figure 13:
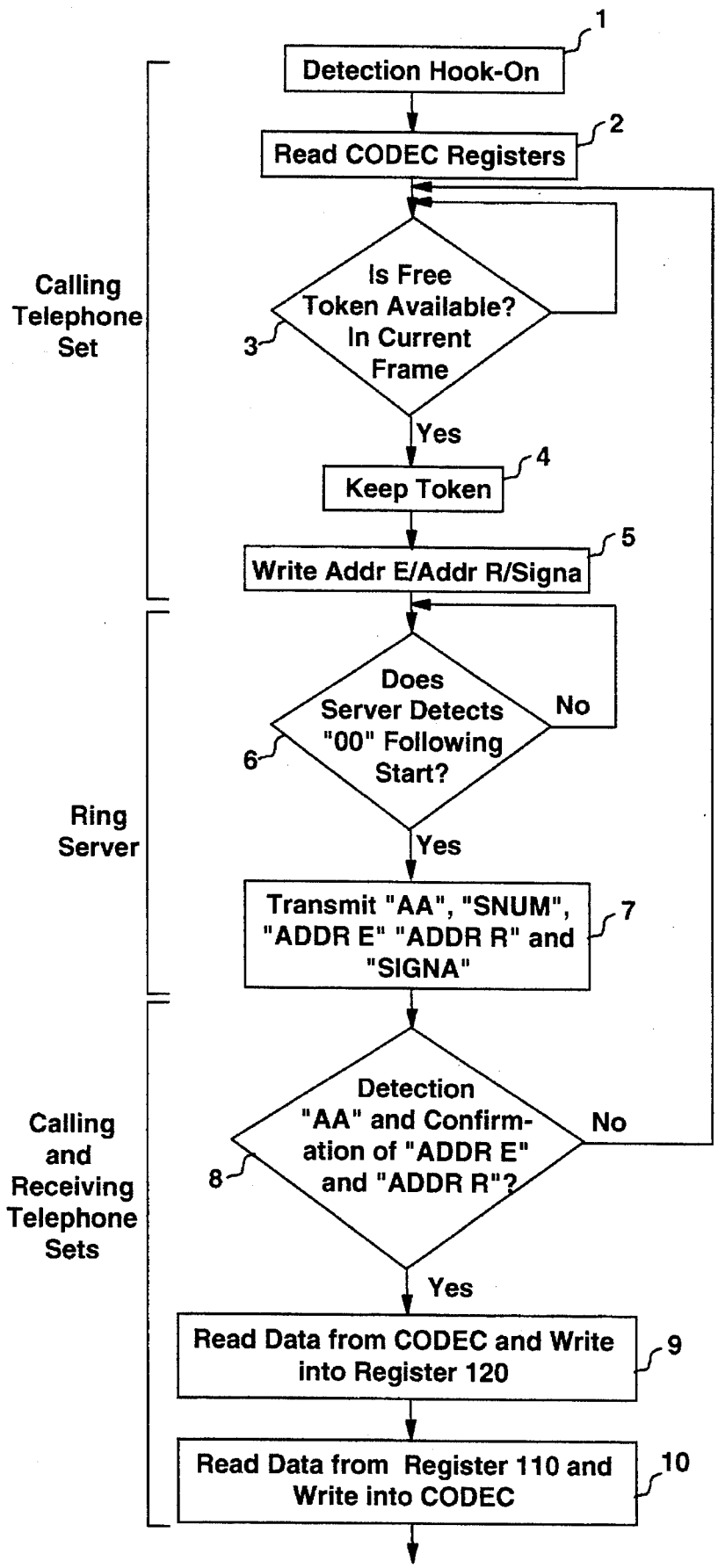
FIG. 13 is a flow chart illustrating the basic steps performed by each station and the station server in order to manage the token.

Now it will be described with details, with reference to FIG. 13, the accurate steps which are performed in the access of the ring by the telephone sets 2–7 and voice server 8.

The process starts with a user wishing to issue a call on a particular telephone set being connected to the ring. The Hook-on of this telephone set is detected by the associated CODEC 80 being located within this telephone set, step 1. Then, the processor 200 which is also located within the latter performs the reading of the internal registers of CODEC 80, for instance to determine the particular communication mode to use, step 2. Step 3, the processor of the calling telephone tries to request an access to the ring by requesting a free token. To achieve this, processor 200 first checks whether a free token is available, that is to say whether the value 'FF' directly follows the START byte "JK0JK000" in the frame of data, step 3.

If the free token was not detected in the frame, an error status is raised which is detected by NAND gate 340 and transmitted to the INT1 interrupt lead of processor 200. The latter will then wait for the next frame to re-request a free token.

In the opposite case, that is to say if a free token is available in the frame, the output of latch 260 switches to a high level on the occurrence of the SYNC control signal (happening just after the appearance of the eighth bit in the byte). This high level results in the generation of a SUBST1 positive level on the occurrence of the first bit of the token byte. Since SUBST1 switches to a high level, the contents of shift register 130, which was previously initialized with the value "00" (in Hex.) is serially transmitted to the D input of latch 50, therefore causing the token to be kept by this telephone set, step 4.

Then, step 5, processor 200 performs the transmission of the fields "ADDR E" "ADDR R" and "SIGNA" within the TDM frame which will be received by the server. This is achieved as follows: as soon as the processor 200 receives the SYNC signal on its P1.0 input lead, the latter sets the P1.4 output lead to one. This maintains the level of SUBST1 signal to a high level during three bytes. Processor 200 also performs a WRITE operation in the register 120 in order to store the values of the above mentioned "ADDR_E", "ADDR_R" and "SIGNA". Therefore, the three latter values can be transmitted on the frame since the SUBST1 signal is maintained at a high level during three bytes as mentioned before.

Step 6, the voice ring server 8 which receives the frame on the token ring detects the existence of the "00" (in Hex) byte following the START byte. Voice ring server 8 then analyses the request by reading the contents of three bytes that follow the pattern "00", and is made aware of the field.

If "00" appears to be lacking within the frame, that is to say that the token has not been taken by one telephone set, then the server takes no step and lets the TDM frame circulating within the ring.

On the contrary, if the server has detected the "00" pattern following the START byte, then the server performs a step 7 where it a token "AA" (in Hex) is transmitted with a value stored in the SNUM field characterizing the number of the slot which will be affected for the communication which is requested.

Also the server retransmits the value of the "ADDR_E", "ADDR_R" and "SIGNA" so that to exactly characterize the accurate communication being allowed. Therefore, since the same frame contains all the information needed by both the calling telephone and the receiving telephone, both telephones will simultaneously be able to communicate as follows:

On the detection of the "AA" token, each telephone performs a test on the value of "ADDR_E" and "ADDR_R" in order to compare the latter with its personal identification address, step 8. Particularly, the calling telephone uses this step for getting a confirmation of the field "ADDR_E" and "ADDR_R" for which it requested the communication. If such confirmation is not given, the latter will proceed to step 3 again in order to request the token again. If the values of the fields corresponds with the values which were requested, both receiving and telephone will be able to simultaneously communicate as follows: for each of the two calling and receiving sets, the processor located therein extracts the value of the "SIGNA" signalling field and transmit it into the associated CODER 80 and also loads the value of SNUM—1 into counter 180. As mentioned above, when the CY carry signal switches to a high level, that is to say just before the slots within the TDM frame which are allocated for the communication between these two sets are available, the processor 200 performs a read operation of the data registers of the CODEC 80 (containing the voice to be transmitted) and writes them into register 120 for allowing its transmission to the ring, step 9. Conversely, on the occurrence of the next SYNC pulse, processor 200 reads the contents of register 110 (loaded with the voice data received from the ring) and writes it into the appropriate register within CODEC 80 so that to provide the corresponding voice message to the user, step 10.

The calling telephone and the answering telephone have the same behaviour except that the calling telephone will identify its address in the ADDR_E Field and the called telephone will see its address in the ADDR_E Field. Other function like ringing of the called telephone will be activated thru the protocol sent between the two CODECS that are linked together. Except this point, the system is symetrical and full duplex.

This process is continuously repeated until the occurrence of a new request coming either from the CODEC, or the RING server.

In the preferred embodiment of the invention, when a HOOK-OFF occurs in one telephone, the corresponding processor 200 generates a request to the server with an appropriate value into the SIGNA byte characterizing this event. Then, the server analyses this request and generates a "AA" token with a "SNUM" field being equal to zero. This will cause the two communicating telephone in releasing the line.

When the server receives its generated frame with "AA" in the token field, it clears the token to "FF" to let another device in the ring have access to it. This free token appears continuously on the ring as long as there is no new request from an adapter (telephone).

This ring can reuse all the existing wiring, analog interface and drivers of the existing token-ring: 802.5 (4–16 Mhz) so that it can be easily installed in building having this appropriate cabling. Furthermore, the structure of the frame and the way it works can be easily integrated on other topologies such as fiber optics, rings or can use other coding on wires. The design is not locked to the HDB3 coding used in the description of the preferred embodiment.

As a conclusion, the TDM frame has two main parts: a first one comprising the token, the 'ADDR_R' the 'ADDR_E' "SNUM" and "SIGNA" fields which allows the management of the token between the different telephone sets or stations connected to the ring. The second part of the TDM field is constituted of a succession of TDM slots which allows the continuous flow of digitalized data, such as voice for instance. The slot is dedicated to a telephone set until the latter releases it. The voice can be digitalized by using the standard PCM 64K. In this case, as the 64 Kbps flow is assured to the user, no additional buffering is needed into the telephone set.

We claim:

1. A telecommunication network including a plurality of telephone stations connected to a ring server station (8) via a token ring over which communication between the stations is conducted in a periodic time division multiplex frame which includes;

a first field (START) for identifying the start of the frame, a second field (TOKEN) which can have one of three different values, the first (FF) a free token, the second, (00) a busy token and the third (AA) for identifying communication from the ring server station (8), a third field (SNUM) identifying a slot number in the multiplex frame, a fourth field (ADDR_E) the address of an emitting station, a fifth field (ADDR_R) the address of a receiving station, a sixth field (SIGNA) representative of a signalling message to be transmitted to the server station (8), and a number (n) of TDM slots used for communicating data, said telecommunication network characterized in that each said station includes:

a receiver (10) for receiving the TDM frame, for generating a first control signal (STADEC) and a second control signal (STODC) which represent the beginning and end ,respectively of the TDM frame;

a counter (70) controlled by said first control signal (STADEC) and clocked by clock signals for generating a third control signal (SYNC); means (20) connected to said receiver (10) for receiving TDM frames coming from the token ring and for generating a clock signal and a data flow (DIN) extracted from the TDM frames;

a coder decoder circuit (80) connected to a telephone set for providing A/D and D/A conversion of voice signals;

a serializer circuit (131) having an input bus connected to the output of a register (120) controlled by a processor (200);

a selector circuit (40) having a first input receiving said data flow extracted from said TDM frame and a second input which is connected to the output of said serializer; said selector having an output lead which is connected to said transmitting means (60) and which receives one among the two signals existing at its input in accordance with the state of a fourth control signal (SUBST1);

a token substitution circuit (35) under control of the processor (200) for detecting the presence of said first value (FF) in said token field and for replacing it with said second value (00) to inform the ring server station (8) that the token is requested and includes;

a first RS latch (190) which has an S input lead receiving said first control signal (STADEC) and an R input lead receiving said third control signal (SYNC); said first RS latch having an output lead which is connected to a first input lead of a first AND gate (240), said first AND gate (240) having a second input receiving said data flow (DIN) and a third input receiving a control signal (REQ) generated by said processor (200) when it wishes to request a token;

a second RS latch which has an S input lead connected to the output of said first AND gate (240) and an R input lead connected to the output of a first OR gate (250); said first OR gate (250) having a first input receiving the inverted data flow (DIN) and a second input lead which receives said third control signal (SYNC); and, a second OR gate (270) which has a first input receiving the output of said second RS latch and a second input which is connected to receive a control signal (output of gate 300) coming from said processor (200), said second OR gate (270) generating said fourth control signal (SUBST1).

2. telecommunication network according to claim 1 characterized in that each station further includes a second AND gate which has a first input lead connected to receive said inverted data flow (DIN), a second input lead receiving said request signal (REQ) generated by said processor and a third input lead connected to the output of said first RS latch (190) for generating an interrupt signal to said processor (200) when said token is not available within the TDM frame.

3. Telecommunication network according to claim 2 characterized in that said station further comprises a third RS latch (300) which has its S input lead connected to the output of a third AND gate (290), said third AND gate (290) having a first input connected to receive a control signal (P1–4) from said processor (200) and a second input which receives said third control signal (SYNC);

said third RS latch (300) having a R input lead which is connected to the output of a fourth AND gate (310); said fourth AND gate (310) having a first input receiving a signal being inverted with respect to the signal received by said third AND gate (290) at its first input; said fourth AND gate (310) having a second input receiving the inverted value of said third control signal (SYNC);

said third RS latch (300) having an output lead which is connected to the second input of said second OR gate (270).

4. Telecommunication network according to claim 3 characterized in that each station comprises: a register (185) being controlled by said processor; said register being loaded with a value being derived from the contents of said third field (SNUM) in the TDM frame;

counting means (180) being initialized with the contents of said register (185) for generating a fifth control signal (CY) to said processor to inform the latter that a particular slot in the TDM frame is being received by said receiver (10).

* * * * *